(12) United States Patent
Kuo et al.

(10) Patent No.: US 11,271,254 B2
(45) Date of Patent: Mar. 8, 2022

(54) ENERGY STORAGE DEVICE

(71) Applicants: NATIONAL CHENG KUNG UNIVERSITY, Tainan (TW); RISING CHEMICAL CO., LTD., Tainan (TW)

(72) Inventors: Ping-Lin Kuo, Tainan (TW); Chih-Hao Tsao, New Taipei (TW); Chia-Wei Chin, New Taipei (TW)

(73) Assignee: POLYBATT MATERIALS CO., LTD., Kaohsiung (TW)

( * ) Notice: Subject to any disclaimer, the term of this patent is extended or adjusted under 35 U.S.C. 154(b) by 308 days.

(21) Appl. No.: 16/540,179

(22) Filed: Aug. 14, 2019

(65) Prior Publication Data
US 2020/0343594 A1    Oct. 29, 2020

(30) Foreign Application Priority Data

Apr. 25, 2019 (TW) ................. 108114585

(51) Int. Cl.
| | |
|---|---|
| *H01M 10/12* | (2006.01) |
| *C08F 220/42* | (2006.01) |
| *H01M 4/13* | (2010.01) |
| *C08F 218/00* | (2006.01) |
| *H01G 9/02* | (2006.01) |

(Continued)

(52) U.S. Cl.
CPC ......... *H01M 10/128* (2013.01); *C08F 218/22* (2020.02); *C08F 220/42* (2013.01); *H01G 9/02* (2013.01); *H01G 9/028* (2013.01); *H01G 9/042* (2013.01); *H01G 9/15* (2013.01); *H01M 4/13* (2013.01); *H01M 4/622* (2013.01); *H01M 10/0565* (2013.01); *H01M 50/411* (2021.01); *H01M 2010/4292* (2013.01); *H01M 2300/0082* (2013.01)

(58) Field of Classification Search
CPC ...... H01M 10/128; H01M 4/13; H01M 4/622; C08F 218/22; C08F 220/42
See application file for complete search history.

(56) References Cited

U.S. PATENT DOCUMENTS

| | | | |
|---|---|---|---|
| 8,993,157 B2 | 3/2015 | Yang et al. | |
| 9,570,751 B2 * | 2/2017 | Cha | H01M 4/621 |

(Continued)

FOREIGN PATENT DOCUMENTS

JP    3944986 B2 *   7/2007

OTHER PUBLICATIONS

Machine translation of JP 3944986 (no date).*

*Primary Examiner* — Amanda C. Walke
(74) *Attorney, Agent, or Firm* — Schmeiser, Olsen & Watts, LLP

(57) ABSTRACT

An energy storage device includes an anode, a cathode, and a separator disposed between the anode and the cathode. At least one of the anode, cathode and separator includes a copolymer functioning as a non-aqueous adhesive and/or solid-state electrolyte for the energy storage device. The copolymer is a copolymer or a derivative thereof, which is produced by polymerization of monomers containing conductive ion group and/or olefinic monomers in the presence of 2-propenenitrile. Therefore, the energy storage device which the copolymer is used therein has excellent charging and discharging performance to therefore effectively enhance the efficiency and extend the service life of the energy storage device.

6 Claims, 3 Drawing Sheets

(51) Int. Cl.
*H01G 9/028* (2006.01)
*H01G 9/042* (2006.01)
*H01G 9/15* (2006.01)
*H01M 4/62* (2006.01)
*H01M 10/0565* (2010.01)
*H01M 50/411* (2021.01)
*H01M 10/42* (2006.01)

(56) References Cited

U.S. PATENT DOCUMENTS

| | | | | |
|---|---|---|---|---|
| 9,601,775 B2* | 3/2017 | Fukumine | ............ | H01M 4/0404 |
| 10,128,496 B2* | 11/2018 | Laicer | ................. | H01M 4/0416 |
| 10,158,109 B2* | 12/2018 | Eitouni | ................. | H01B 1/122 |
| 10,497,963 B2* | 12/2019 | Kim | ...................... | H01M 4/622 |
| 10,633,492 B2* | 4/2020 | Kim | ................... | H01M 4/0407 |
| 10,700,377 B2* | 6/2020 | Thomas-Alyea | ..... | H01M 4/661 |
| 10,823,067 B2* | 11/2020 | Sennoun | ............... | F28D 1/0471 |
| 10,854,881 B2* | 12/2020 | Komaba | ........... | H01M 10/0525 |
| 10,985,375 B2* | 4/2021 | Annaka | ............... | H01M 4/1391 |
| 2012/0171575 A1* | 7/2012 | Wee | ....................... | H01G 9/038 |
| | | | | 429/301 |
| 2014/0154612 A1* | 6/2014 | Krishnan | ............ | H01M 8/1023 |
| | | | | 429/493 |
| 2016/0326192 A1* | 11/2016 | Zhang | ................... | C07F 7/1804 |

* cited by examiner

ENERGY STORAGE DEVICE

CROSS-REFERENCE TO RELATED APPLICATION

This non-provisional application claims priority under 35 U.S.C. § 119(a) on Patent Application No(s). 108114585 filed in Taiwan, R.O.C. on Apr. 25, 2019, the entire contents of which are hereby incorporated by reference.

BACKGROUND OF THE INVENTION

1. Field of the Invention

The present disclosure relates to energy storage devices, and in particular to an energy storage device with an anode, a cathode and a separator, at least one of which comprises a copolymer, and the copolymer is a copolymer or a derivative thereof, which is produced by polymerization of monomers containing conductive ion group and/or olefinic monomers in the presence of 2-propenenitrile.

2. Description of the Related Art

Energy storage devices are widely used in various electronic products. The physical and chemical properties of the copolymers used in energy storage devices have a certain degree of effect on the charging and discharging performance of the energy storage devices. Therefore, it is important to modify the chemical structures of the copolymers in order to improve the charging and discharging performance of the energy storage devices.

U.S. Pat. No. 8,993,157 B2 discloses an electrochemical cell. The copolymer (PVDF-g-PAN) used in the anode of the electrochemical cell is produced by grafting 2-propenenitrile group onto the main chain which consists of polyvinylidene difluoride (PVDF).

BRIEF SUMMARY OF THE INVENTION

There is still room for improvement in the charging and discharging performance of conventional energy storage devices in terms of the copolymers used therein. In view of this, an objective of the present disclosure is to provide an energy storage device with excellent charging and discharging performance.

To achieve at least the above objective, the present disclosure provides an energy storage device, comprising:
an anode and a cathode; and
a separator disposed between the anode and the cathode;
wherein at least one of the anode, cathode and separator comprises a copolymer functioning as a non-aqueous adhesive and/or electrolyte of the energy storage device, wherein the adhesive is applicable to a non-aqueous coating process of lithium cell cathode, anode or separator. The electrolyte includes gel-state and solid-state. The copolymer is a copolymer or a derivative thereof, which is produced by polymerization of monomers containing conductive ion group and/or olefinic monomers in the presence of 2-propenenitrile.

In an embodiment of the present disclosure, the copolymer has a structure expressed by the formula below,

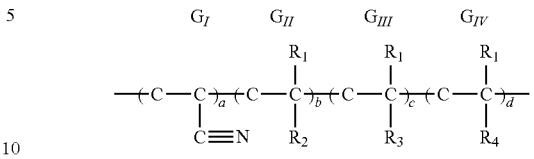

wherein,
$G_I$ is derived from 2-propenenitrile or cyano-containing monomer;
$G_{II}$ is derived from polar monomers which contains conductive ion group, wherein $R_2$ includes at least one selected from the group consisting of amide, amino group, pyrrolidone group, ether group, imidazole group, ammonium group, $R-NH_3^+$, $(R)_2-NH_2^+$, $(R)_3-NH^+$, $(R)_4-N^+$, carboxy group, wherein carboxy group includes acrylic acid, methacrylic acid, maleic acid, and itaconic acid, sulfide-containing acidic group, such as sulfonic acid group ($-SO_3H$), sulfuric group, phosphide-containing acidic group, such as phosphoric acid group ($-PO_3H_3$), and the acidic group-derived ester group or and quaternary ammonium, quaternary phosphate-derived salt group of above acidic group, pyrrolidone group and imidazole group, and a combination thereof;
$G_{III}$ is derived from monomers which contains a reactive group, wherein $R_3$ includes one selected from the group consisting of hydroxy group, epoxy group, isocyanate group, amino group, and a combination thereof;
$G_{IV}$ is derived from olefinic monomers, wherein $R_4$ includes one selected from the group consisting of $C_1$-$C_{30}$ saturated or unsaturated alkyl group, phenyl group, benzyl group, and a combination thereof;
wherein $R_1$ is H or $CH_3$;
wherein the number of repeat units of the copolymer meets the following criteria:

$$\frac{a}{a+b+c+d} > 0, \frac{b}{a+b+c+d} > 0, \frac{c}{a+b+c+d} \geq 0, \frac{d}{a+b+c+d} \geq 0,$$

perferably $$\frac{a}{a+b+c+d} > 30\%.$$

In an embodiment of the present disclosure, in the copolymer,
$G_I$ is derived from 2-propenenitrile or cyano-containing monomer;
$G_{II}$ is derived from polar monomers which contains conductive ion group and includes at least one selected from the group consisting of n-vinylpyrrolidone, acrylamide, methacrylamide, N,N-dimethyl acrylamide, N,N-diethyl acrylamide, acryloyl morpholine, acrylic acid, methacrylic acid, vinyl acetate, poly(ethylene glycol) methacrylate, polystyrene sulfonate, and a combination thereof;
$G_{III}$ is derived from monomers which contains a reactive group and includes one selected from the group consisting of glycidyl methacrylate, glycidyl acrylate, vinyl epoxy cyclohexane, 2-(2-oxiranylmethoxy)ethyl methacrylate, 2-hydroxyethyl methacrylate, allylamine, vinylamine, and a combination thereof;

$G_{IV}$ is derived from olefinic monomers and includes one selected from the group consisting of 2-ethylhexyl acrylate, n-butyl acrylate, isobutyl acrylate, methyl acrylate, vinyl chloride, vinylidene chloride, vinyl bromide, dibutyl Itaconate, dimethyl maleate, diethyl maleate, dibutyl maleate, styrene, methyl methacrylate, 1,3-butadiene, isoprene, and a combination thereof.

In an embodiment of the present disclosure, the copolymer further reacts with polyether amine, polyether diamine, taurine, imidazole, 1,3-propanesultone or a derivative thereof so as to be modified or cross-linked. Therefore, the copolymer is modified to become a copolymer having anions, cations, non-ions or cross-linked structures.

The copolymer of the present disclosure is prepared by radical polymerization, active radical polymerization, emulsification polymerization or redox polymerization.

For example, a ring-opening reaction occurs to the epoxy group in the repeat units derived from the epoxy-containing monomers (such as glycidyl methacrylate) in the copolymer and thus link a non-ion, cation or anion group such that the copolymer is modified or cross-linked, or the copolymer and another copolymer form a cross-linked structure by the ring-opening reaction. The copolymer further reacts with polyether amine, taurine, polyether diamine, imidazole or a derivative thereof so as to be modified or cross-linked such that the modified or cross-linked copolymer is applicable to the energy storage device of the present disclosure.

In an embodiment of the present disclosure, the anode of the energy storage device contains active substances, electrically conductive carbon and the copolymer, and the weight percentage of the copolymer in the anode is 0.01~30%.

In an embodiment of the present disclosure, the weight percentage of the copolymer in the cathode is 0.01~30%.

In an embodiment of the present disclosure, the separator is formed by coating a paste or formula, wherein the weight percentage of the copolymer in the paste or formula is 0.1~30%.

In an embodiment of the present disclosure, the weight percentage of the copolymer in the solid-state electrolyte is 0.1~90%.

The energy storage device of the present disclosure has excellent charging and discharging performance, using a specific copolymer to therefore effectively enhance the efficiency and extend the service life of the energy storage device.

DETAILED DESCRIPTION OF THE INVENTION

Figure 1:
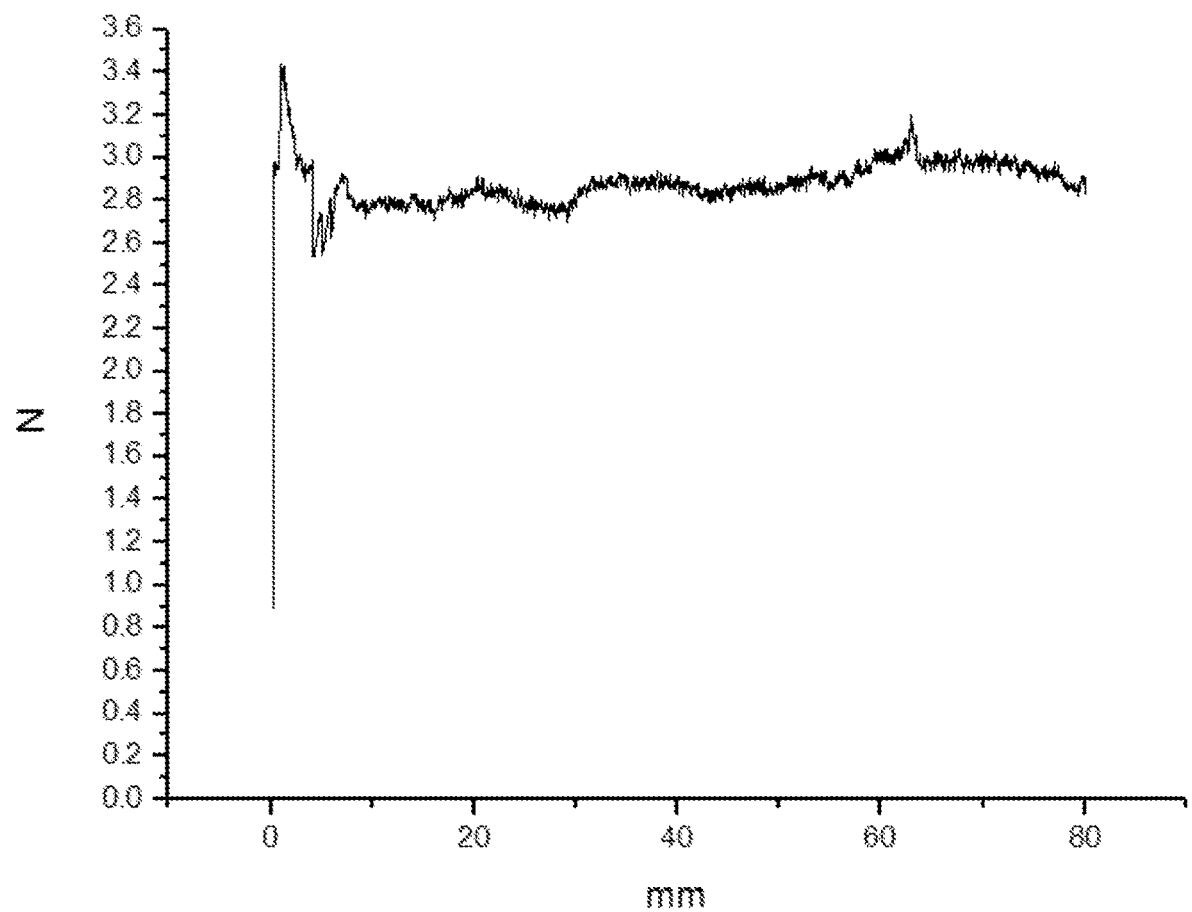
FIG. 1 shows the results of an adhesiveness test conducted on a copolymer P(AN-GMA-NVP)-containing Li(NiCoMn)O$_2$ positive electrode.

To facilitate understanding of the object, characteristics and effects of this present disclosure, embodiments together with the attached drawings for the detailed description of the present disclosure are provided.

The copolymer used in the energy storage device of the present disclosure is a copolymer or a derivative thereof, which is produced by polymerization of monomers containing conductive ion group and/or olefinic monomers in the presence of 2-propenenitrile. For instance, the olefinic monomers are olefinic pyrrolidone, methylacrylate, polyethylene glycol methacrylate, styrene, acrylic monomers or olefinic pyridine. The copolymer is a copolymer or a derivative thereof, which is produced by polymerization of monomers containing conductive ion group, olefinic monomers and/or monomers containing epoxy in the presence of 2-propenenitrile. The monomers containing epoxy are glycidyl methacrylate, glycidyl acrylate, vinyl epoxy cyclohexane or 2-(2-oxiranylmethoxy)ethyl methacrylate, and the copolymer has a structure expressed by the formula below,

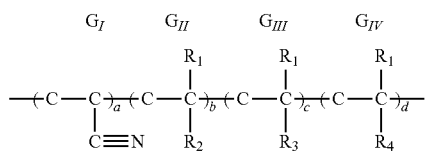

wherein, $G_I$ is derived from 2-propenenitrile;

$G_{II}$ is derived from polar monomers which contains conductive ion group, wherein $R_2$ includes at least one selected from the group consisting of amide, amino group, pyrrolidone group, ether group, imidazole group, ammonium group, R—NH$_3^+$, (R)$_2$—NH$_2^+$, (R)$_3$—NH$^+$, (R)$_4$—N$^+$), carboxy group, wherein the carboxy group includes acrylic acid, methacrylic acid, maleic acid or itaconic acid, sulfide-containing acidic group, such as sulfonic acid group, —SO$_3$H, sulfuric group, phosphide-containing acidic group, such as phosphoric acid group, —PO$_3$H$_3$, the acidic group-derived ester group or the acidic group, pyrrolidone group, imidazole group and any other quaternary ammonium, quaternary phosphate-derived salt group, and a combination thereof;

$G_{III}$ is derived from monomers which contains a reactive group, wherein $R_3$ includes one selected from the group consisting of hydroxy group, epoxy group, isocyanate group, amino group, and a combination thereof;

$G_{IV}$ is derived from olefinic monomers, wherein $R_4$ includes one selected from the group consisting of C$_1$~C$_{30}$ saturated or unsaturated alkyl group, phenyl group, benzyl group, and a combination thereof;

wherein $R_1$ is H or CH$_3$;

wherein the number of repeat units of the copolymer meets the following criteria:

$$\frac{a}{a+b+c+d} > 0, \frac{b}{a+b+c+d} > 0, \frac{c}{a+b+c+d} \geq 0, \frac{d}{a+b+c+d} \geq 0.$$

In an embodiment of the present disclosure, the number a of repeat units is 100~50000; the number b of repeat units is 100~10000; the number c of repeat units is 100~10000; and the number d of repeat units is 100~10000.

Embodiment 1

Embodiment 1-1: Preparation of P(AN-NVP)

Blend and mix 2-propenenitrile and N-vinylpyrrolidone at the ratio of 9:1. Add to the mixture an appropriate amount of azobis isobutyl ether hydrochloride as an initiator. Heat the mixture at 60° C. for 12 hours for continuous reaction. Afterward, filter the resultant product by centrifugal filtration. Dry the resultant white solid in a vacuum oven for 24 hours to obtain 2-propenenitrile-pyrrolidone copolymer. This product is named P(AN-NVP).

The product in embodiment 1-1 is expressed by formula (IV) below,

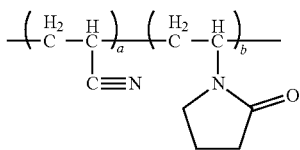

Ratio of a to b is 9:1.

Embodiment 1-2: Preparation of P(AN-Am)

Mix acrylonitrile and methacrylamide at the ratio of 9:1 by weight. Add to the mixture an appropriate amount of an initiator. Heat the mixture at 60° C. for 12 hours for continuous reaction. Afterward, filter the resultant product by centrifugal filtration. Dry the resultant white solid in a vacuum oven for 24 hours to obtain 2-propenenitrile methylacrylate copolymer. This product is named P(AN-Am).

The product in embodiment 1-2 is expressed by formula (V) below,

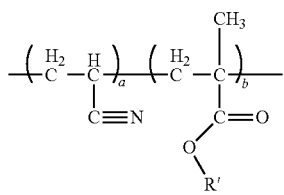

wherein $R_1$ is —$NH_2$;
R' is —$CH_3$;
Ratio of a to b is 9:1.

Embodiment 1-3: Preparation of P(AN-AA)

Mix acrylonitrile and acrylic acid at the ratio of 9:1 by weight. Add to the mixture an appropriate amount of an initiator. Heat the mixture at 60° C. for 12 hours for continuous reaction. Afterward, filter the resultant product by centrifugal filtration. Dry the resultant white solid in a vacuum oven for 24 hours to obtain 2-propenenitrile-acrylate copolymer. This product is named P(AN-AA).

The product in embodiment 1-3 is expressed by formula (VI) below,

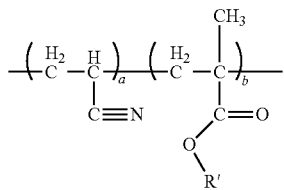

wherein
Ratio of a to b is 9:1;
R1 and R' are H.

Embodiment 1-4: Preparation of P(AN-GMA-NVP)

Blend and mix 2-propenenitrile, glycidyl methacrylate and N-vinylpyrrolidone at the ratio of 9:1:1 by weight. Add to the mixture an appropriate amount of azobis isobutyl ether hydrochloride as an initiator. Heat the mixture at 60° C. for 12 hours for continuous reaction. Afterward, filter the resultant product by centrifugal filtration. Dry the resultant white solid in a vacuum oven for 24 hours to obtain 2-propenenitrile-glycidyl methacrylate-pyrrolidone copolymer. This product is named P(AN-GMA-NVP).

The product in embodiment 1-4 is expressed by formula (VII) below,

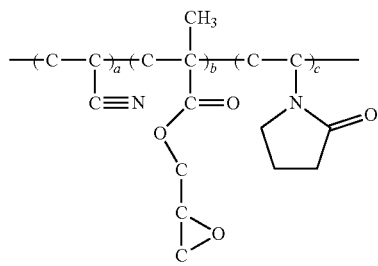

Ratio of a, b and c is 9:1:1.

Embodiment 1-5: Preparation of P(AN-GMA-MMA) by Modifying Copolymer with Polyether Amine Dissolve 3 g of P(AN-GMA-MMA) produced in embodiment 1-4 in 20 ml of NMP and then add thereto 0.3 g of polyether amine (M1000, Huntsman). Allow the solutes in the solution to react at 60° C. for six hours, so as to produce polyether amine modified P(AN-GMA-MMA).

Embodiment 1-6: Preparation of P(AN-GMA-MMA), by Modifying Cross-Linked Copolymer with Polyether Diamine Dissolve 3 g of P(AN-GMA-MMA) produced in embodiment 1-4 in 20 ml of NMP and then add thereto 0.3 g of polyether diamine (ED2003, Huntsman). Allow the solutes in the solution to react at 60° C. for six hours to obtain polyether diamine-modified cross-linked P(AN-GMA-MMA) polymer.

Embodiment 1-7: Preparation of P(AN-GMA-MMA), by Modifying a Copolymer with an Anion Group Dissolve 3 g of P(AN-GMA-MMA) produced in embodiment 1-4 in 20 ml of NMP and then add thereto 0.1 g of taurine. Allow the solutes in the solution to react at 60° C. for six hours to obtain anion group-modified cross-linked P(AN-GMA-MMA) polymer.

Embodiment 2

Embodiment 2-1: Preparation of P(AN-ALi-PEGMA-VP)

Blend and mix 2-propenenitrile, glycidyl methacrylate, polyethylene glycol methacrylate and N-vinylpyrrolidone at the ratio of 9:1:0.5:0.5 by weight. Add an appropriate amount of an initiator to the mixture. Heat the mixture at 60° C. for 12 hours for continuous reaction. Introduce 1M LiOH into the reactor and blend the mixture therein for 24 hours. Afterward, filter the resultant product by centrifugal filtration. Dry the resultant white solid in a vacuum oven for 24 hours to obtain 2-propenenitrile copolymer. This product is named P(AN-ALi-PEGMA-VP).

The product in embodiment 2-1 is expressed by formula (VII) below,

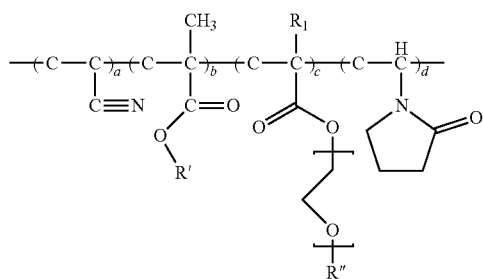

wherein $R_1$ is —$CH_3$;
R' is Li;
R" is —$CH_3$;
Ratio of a, b, c and d is 9:1:0.5:0.5.

Embodiment 2-2: Preparation of P(AN-GMA-PEGMA-MMA)

Blend and mix 2-propenenitrile, glycidyl methacrylate, polyethylene glycol methacrylate and methyl methacrylate at the ratio of 9:1:0.5:0.5 by weight. Add an appropriate amount of an initiator to the mixture. Heat the mixture at 60° C. for 12 hours for continuous reaction. Afterward, filter the resultant product by centrifugal filtration. Dry the resultant white solid in a vacuum oven for 24 hours to obtain 2-propenenitrile copolymer. This product is named P(AN-GMA-PEGMA-MMA).

The product in embodiment 2-2 is expressed by formula (VIII) below,

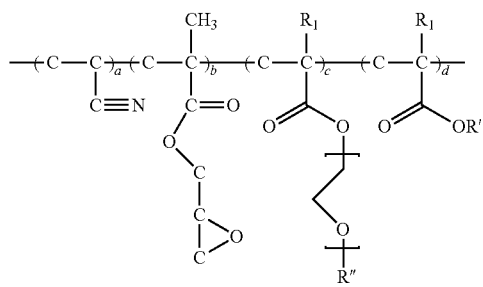

wherein $R_1$ is —$CH_3$;
R' is —$CH_3$;
R" is —$CH_3$;
Ratio of a, b, c and d is 9:1:0.5:0.5.

Embodiment 2-3: Preparation of P(AN-Am-VP-SSt)

Blend and mix 2-propenenitrile, methacrylamide, N-vinylpyrrolidone and sulfonated styrene at the ratio of 9:1:0.5:0.5 by weight. Add an appropriate amount of an initiator to the mixture. Heat the mixture at 60° C. for 12 hours for continuous reaction. Afterward, filter the resultant product by centrifugal filtration. Dry the resultant white solid in a vacuum oven for 24 hours to obtain 2-propenenitrile copolymer. This product is named P(AN-Am-VP-SSt).

The product in embodiment 2-3 is expressed by formula (IX) below,

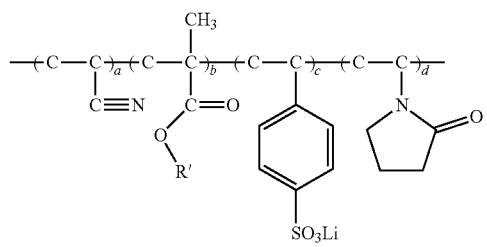

R' is —$NH_2$;
Ratio of a, b, c and d is 9:1:0.5:0.5.

Embodiment 3

Embodiment 3-1: Preparation of P(AN-GMA-PEGMA-MMA-VP)

Blend and mix 2-propenenitrile, glycidyl methacrylate, polyethylene glycol methacrylate, methyl methacrylate, and N-vinylpyrrolidone at the ratio of 9:0.15:0.15:1:1 by weight. Add an appropriate amount of an initiator to the mixture. Heat the mixture at 60° C. for 12 hours for continuous reaction. Afterward, filter the resultant product by centrifugal filtration. Dry the resultant white solid in a vacuum oven for 24 hours to obtain 2-propenenitrile copolymer. This product is named P(AN-GMA-PEGMA-MMA-VP).

The product in embodiment 3-1 is expressed by formula (X) below,

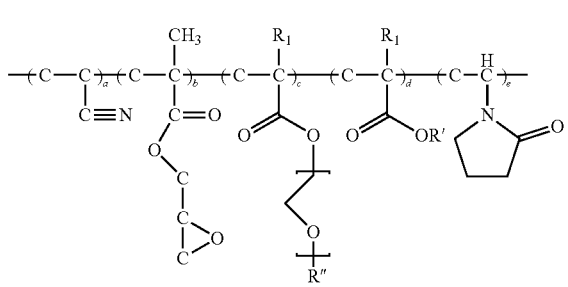

wherein $R_1$ is —$CH_3$;
R' is —$CH_3$;
R" is —$CH_3$;
Ratio of a, b, c, d and e is 9:0.15:0.15:1:1.

Embodiment 3-2: Preparation of P(AN-Mam-EG-VP-Im)

Blend and mix 2-propenenitrile, N,N-dimethylmethacrylamide, polyethylene glycol methacrylate, N-vinylpyrrolidone and 1-vinylimidazole at the ratio of 8.9:1:0.2:0.2:0.7 by weight. Add an appropriate amount of an initiator to the mixture. Heat the mixture at 60° C. for 12 hours for continuous reaction. Afterward, filter the resultant product by centrifugal filtration. Dry the resultant white solid in a vacuum oven for 24 hours to obtain 2-propenenitrile copolymer. This product is named P(AN-Mam-EG-VP-Im).

The product in embodiment 3-2 is expressed by formula (XI) below,

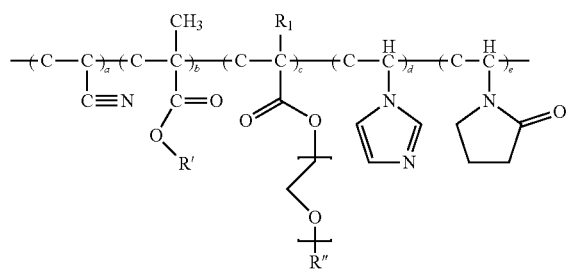

wherein $R_1$ is —$CH_3$;
R' is —$N(CH_3)_2$;
R" is —$CH_3$;
Ratio of a, b, c, d and e is 8.9:1:0.2:0.2:0.7.

Embodiment 4

Embodiment 4-1: Preparation of the Li(NiCoMn)$O_2$ Positive Electrode Plate, Using the Copolymer of Embodiments 1-1~3-2 as an Adhesive Use the copolymer prepared in embodiments 1-1~3-2 as an adhesive. Blend and mix it, commercially-available charcoal powder (Super P) and commercially-available Li(NiCoMn)$O_2$ (BASF) at the ratio of 2.1:2.5:95.4 by weight in solvent, such as NMP, and then blend the mixture with a blender (Hai Yu) for an hour to form a paste. Coat the paste onto aluminum foil with automatic coating machine (elcometer, 3570). Place the paste-coated aluminum foil in a vacuum oven, and heat the paste-coated aluminum foil in the vacuum oven at 100° C. for 24 hours. Afterward, roll-press the paste-coated aluminum foil with a roll-press machine to produce the Li(NiCoMn)$O_2$ positive electrode which contains the copolymer of embodiments 1-1~3-2.

Embodiment 4-2: Pull Test Conducted on Copolymer-Containing Positive Electrode Adhere 3M adhesive tape to the positive electrode test plate prepared in embodiment 4-1 and conduct a pull test on the positive electrode test plate with a puller (ALGOL, JSV-HS1000).

Figure 2:
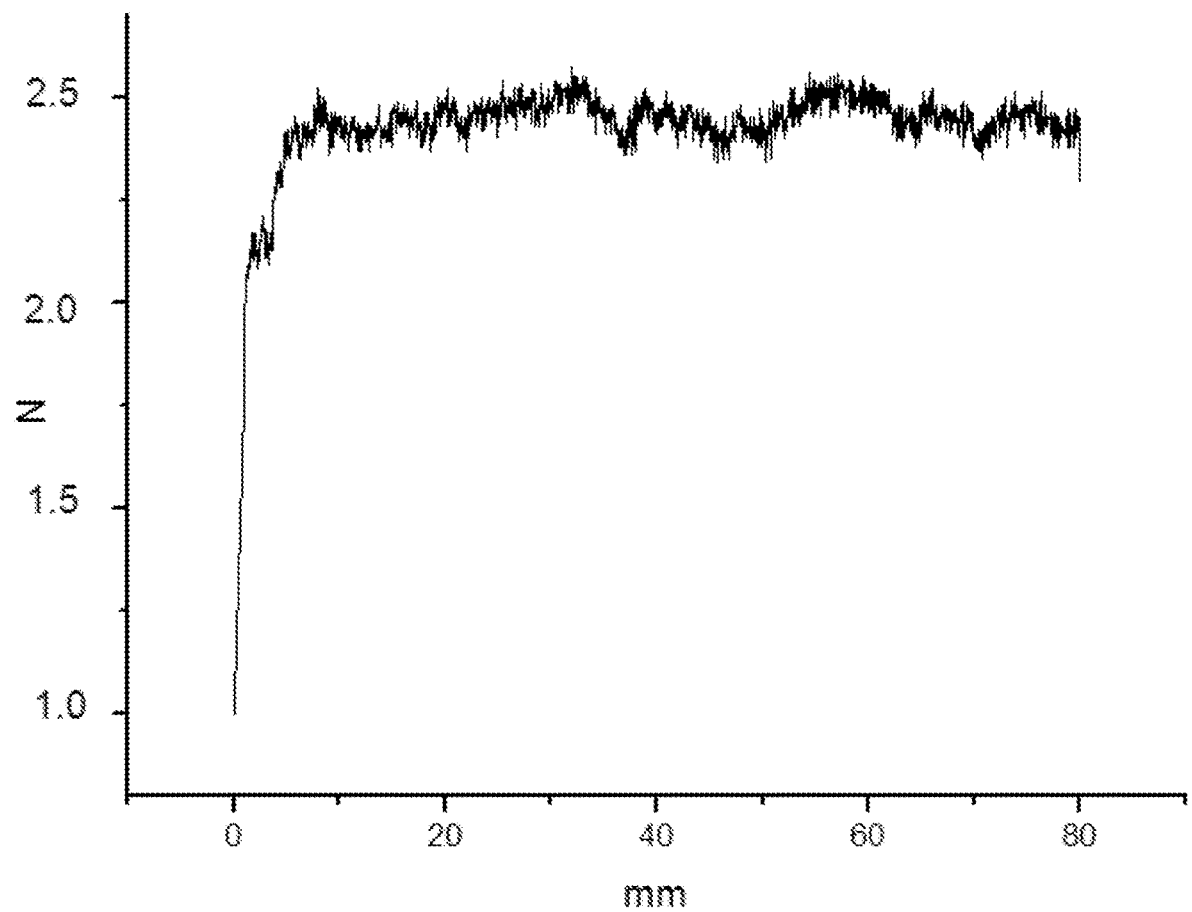
FIG. 2 shows the results of an adhesiveness test conducted on a copolymer P(AN-GMA-MMA)-containing Li(NiCoMn)O$_2$ positive electrode.

FIG. 1 shows the results of a pull test conducted on the positive electrode, using the P(AN-NVP) of embodiment 1-1 as the adhesive of the positive electrode. FIG. 2 shows the results of a pull test conducted on the positive electrode, using the P(AN-Am) of embodiment 1-2 as the adhesive of the positive electrode, indicating that embodiments 1-1 and 1-2 demonstrate better adhesiveness than PVDF.

Embodiment 4-3: a Charging and Discharging Test is Conducted on the Lithium-Ion Cell with a Copolymer-Containing Positive-Electrode Package the positive electrode plate prepared in embodiment 4-1 in the form of button cells. First, use commercially-available polypropylene (PP) film as a separator disposed between the Li(NiCoMn)$O_2$ positive electrode and lithium negative electrode. Measure the charging and discharging performance of the copolymer-containing positive-electrode lithium-ion half-cell with a low-current automated charging and discharging test system (AcuTech Systems, BAT-750B). Set the voltage to 2.8~4.2V, the charging current to 0.1 C, and the discharging current to 0.1 C, 0.5 C, 1 C, 3 C, 5 C. The results are shown in the tables below.

Table 1~Table 8 show the discharging capacitance levels against the current levels of the lithium-ion half-cell with the copolymer-containing positive-electrode. As indicated by Tables 1~8, regardless of its constituents and ratios thereof, the copolymer brings about better charging and discharging performance than PVDF at whatever charging and discharging current levels when functioning as an electrode adhesive.

TABLE 1

Capacitance levels of the positive electrode half-cell which contains the copolymer of embodiment 1-1 against charging and discharging currents

| | discharge speed (C-rate) | | | | |
|---|---|---|---|---|---|
| | C/10 | C/2 | 1 C | 3 C | 5 C |
| capacitance (mAh g$^{-1}$) | 140 | 130 | 122 | 98 | 76 |

TABLE 2

Capacitance levels of the positive electrode half-cell which contains the copolymer of embodiment 1-2 against charging and discharging currents

| | discharge speed (C-rate) | | | | |
|---|---|---|---|---|---|
| | C/10 | C/2 | 1 C | 3 C | 5 C |
| capacitance (mAh g$^{-1}$) | 145 | 131 | 122 | 99 | 78 |

TABLE 3

Capacitance levels of the positive electrode half-cell which contains the copolymer of embodiment 1-3 against charging and discharging currents

| | discharge speed (C-rate) | | | | |
|---|---|---|---|---|---|
| | C/10 | C/2 | 1 C | 3 C | 5 C |
| capacitance (mAh g$^{-1}$) | 143 | 131 | 121 | 98 | 76 |

TABLE 4

Capacitance levels of the positive electrode half-cell which contains the copolymer of embodiment 1-4 against charging and discharging currents

| | discharge speed (C-rate) | | | | |
|---|---|---|---|---|---|
| | C/10 | C/2 | 1 C | 3 C | 5 C |
| capacitance (mAh g$^{-1}$) | 143 | 128 | 119 | 85 | 64 |

TABLE 5

Capacitance levels of the positive electrode half-cell which contains the copolymer of embodiment 1-5 against charging and discharging currents

| | discharge speed (C-rate) | | | | |
|---|---|---|---|---|---|
| | C/10 | C/2 | 1 C | 3 C | 5 C |
| capacitance (mAh g$^{-1}$) | 142 | 128 | 120 | 83 | 60 |

TABLE 6

Capacitance levels of the positive electrode half-cell which contains the copolymer of embodiment 1-6 against charging and discharging currents

| | discharge speed (C-rate) | | | | |
|---|---|---|---|---|---|
| | C/10 | C/2 | 1 C | 3 C | 5 C |
| capacitance (mAh g$^{-1}$) | 143 | 138 | 130 | 100 | 82 |

TABLE 7

Capacitance levels of the positive electrode half-cell which contains the copolymer of embodiment 1-7 against charging and discharging currents

| | discharge speed (C-rate) | | | | |
|---|---|---|---|---|---|
| | C/10 | C/2 | 1 C | 3 C | 5 C |
| capacitance (mAh g$^{-1}$) | 142 | 138 | 125 | 92 | 80 |

TABLE 8

Capacitance levels of the positive electrode half-cell which contains the copolymer of embodiment 2-1 against charging and discharging currents

| | discharge speed (C-rate) | | | | |
|---|---|---|---|---|---|
| | C/10 | C/2 | 1 C | 3 C | 5 C |
| capacitance (mAh g$^{-1}$) | 143 | 130 | 122 | 99 | 77 |

TABLE 9

Capacitance levels of the positive electrode half-cell which contains the copolymer of embodiment 2-2 against charging and discharging currents

| | discharge speed (C-rate) | | | | |
|---|---|---|---|---|---|
| | C/10 | C/2 | 1 C | 3 C | 5 C |
| capacitance (mAh g$^{-1}$) | 140 | 129 | 120 | 97 | 78 |

TABLE 10

Capacitance levels of the positive electrode half-cell which contains the copolymer of embodiment 2-3 against charging and discharging currents

| | discharge speed (C-rate) | | | | |
|---|---|---|---|---|---|
| | C/10 | C/2 | 1 C | 3 C | 5 C |
| capacitance (mAh g$^{-1}$) | 141 | 131 | 120 | 97 | 78 |

TABLE 11

Capacitance levels of the positive electrode half-cell which contains the copolymer of embodiment 3-1 against charging and discharging currents

| | discharge speed (C-rate) | | | | |
|---|---|---|---|---|---|
| | C/10 | C/2 | 1 C | 3 C | 5 C |
| capacitance (mAh g$^{-1}$) | 142 | 131 | 121 | 98 | 76 |

TABLE 12

Capacitance levels of the positive electrode half-cell which contains the copolymer of embodiment 3-2 against charging and discharging currents

| | discharge speed (C-rate) | | | | |
|---|---|---|---|---|---|
| | C/10 | C/2 | 1 C | 3 C | 5 C |
| capacitance (mAh g$^{-1}$) | 141 | 132 | 122 | 98 | 77 |

Embodiment 5

Embodiment 5-1: Preparation of Graphite Negative Electrode Plate, Using the Copolymer of Embodiments 1-1~3-2 as Adhesive Use the copolymer prepared in embodiments 1-1~3-2 as the adhesive. Mix it, commercially-available charcoal powder (Super P), and commercially-available graphite at the ratio of 3.8:1.8:94.4 by weight in solvent, such as NMP, and then blend the mixture with a blender (Hai Yu) for an hour to form a paste. Coat the paste onto copper foil with automatic coating machine (elcometer, 3570). Place the paste-coated copper foil in a vacuum oven, and heat the paste-coated copper foil in the vacuum oven at 100° C. for 24 hours. Afterward, roll-press the paste-coated copper foil with a roll-press machine to produce the graphite negative electrode plate which contains the copolymer of embodiments 1-1~3-2.

Embodiment 5-2: a Charging and Discharging Test Conducted on a Lithium-Ion Cell which Comprises the Copolymer Negative-Electrode Package the positive electrode plate prepared in embodiment 5-1 in the form of button cells. First, use commercially-available polypropylene (PP) film as a separator disposed between the graphite negative electrode and lithium positive electrode. Measure the charging and discharging performance of the lithium-ion half-cell with the copolymer-containing negative-electrode, using a low-current automated charging and discharging test system (AcuTech Systems, BAT-750B). Set the voltage to 0.05-2V, the charging current to 0.1 C, and the discharging current to 0.1 C, 0.5 C, 1 C, 3 C, 5 C.

Table 13 and Table 14 show the discharging capacitance levels against the current levels of the copolymer-containing lithium-ion half-cell. As indicated by the results shown in Tables 13, 14, in both embodiments 1-1 and 1-2, the copolymer has better performance than PVDF in the negative electrode test.

TABLE 13

Capacitance levels of the negative electrode half-cell which contains the copolymer in embodiment 1-1 against charging and discharging currents

| | discharge speed (C-rate) | | | |
| --- | --- | --- | --- | --- |
| | C/10 | C/2 | 1 C | 3 C |
| capacitance (mAh g$^{-1}$) | 349 | 304 | 233 | 59 |

TABLE 14

Capacitance levels of the negative electrode half-cell which contains the copolymer of embodiment 1-2 against charging and discharging currents

| | discharge speed (C-rate) | | | |
| --- | --- | --- | --- | --- |
| | C/10 | C/2 | 1 C | 3 C |
| capacitance (mAh g$^{-1}$) | 352 | 303 | 230 | 57 |

Embodiment 6

Embodiment 6-1: Preparation of Ceramic-Coated Separator, Using the Copolymer of Embodiment 1-1 as the Adhesive Use the copolymer prepared in embodiment 1-1 as a release film-coated adhesive. Dissolve the copolymer prepared in embodiment 1-1 in NMP. Distributed uniformly aluminum oxide (Al$_2$O$_3$) powder and the copolymer of embodiment 1-1 at the ratio of 8:2 in the NMP solution and then coat it onto the release film. Dry the coated release film at 80° C. to obtain the ceramic-coated separator.

Package the ceramic-coated separator prepared in embodiment 6-1 in the form of button cells. First, use the ceramic-coated separator as a separator disposed between the Li(NiCoMn)O$_2$ positive electrode and lithium negative electrode. Measure the charging and discharging performance of the copolymer-containing lithium-ion half-cell with a low-current automated charging and discharging test system (AcuTech Systems, BAT-750B). Set the voltage to 0.05~2V, the charging current to 0.1 C, and the discharging current to 0.1 C, 0.5 C, 1 C, 3 C, 5 C.

TABLE 14

Capacitance levels of the half-cell comprising the ceramic-coated separator in embodiment 6-1 against charging and discharging currents

| | discharge speed (C-rate) | | | |
| --- | --- | --- | --- | --- |
| | C/10 | C/2 | 1 C | 3 C |
| capacitance (mAh g$^{-1}$) | 170 | 161 | 139 | 97 |

The aforesaid embodiments show that the copolymer used in the energy storage device of the present disclosure contains at least one of the repeat units expressed by formula (A), for example, in embodiments 2-3, 3-2.

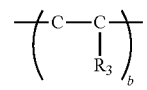

The copolymer used in the energy storage device of the present disclosure may also contain at least one of the repeat units expressed by formula (B), for example, in embodiments 2-2, 3-1.

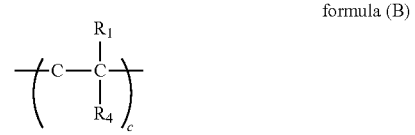

formula (B)

The copolymer used in the energy storage device of the present disclosure may also contain any combination of the repeat units expressed by formula (A) and formula (B).

Embodiment 7

Embodiment 7-1 Involves Mixing the Copolymer of Embodiment 1-1 and Commercially-Available PVDF in Order to Provide Li(NiCoMn)O$_2$ Positive Electrode Plate for the Adhesive Mix PVDF, P(AN-NVP) copolymer of embodiment 1-1, commercially-available Super P and commercially-available Li(NiCoMn)O$_2$ (BASF) at the ratio of 1.05:1.05:2.5:95.4 by weight in solvent, such as NMP, and then blend the mixture with a blender (Hai Yu) for an hour to form a paste. Coat the paste onto aluminum foil with automatic coating machine (elcometer, 3570), then place the paste-coated aluminum foil in a vacuum oven, and heat the paste-coated aluminum foil in the vacuum oven at 100° C. for 24 hours. Afterward, roll-press the paste-coated aluminum foil with a roll-press machine to produce Li(NiCoMn)$O_2$ positive electrode, using Pristine PVDF as adhesive.

Embodiment 7-2: package the PVDF Li(NiCoMn)$O_2$ positive electrode prepared in embodiment 7-1 in the form of button cells. First, use commercially-available polypropylene (PP) film as a separator disposed between the Li(NiCoMn)$O_2$ positive electrode and lithium negative electrode. Measure the charging and discharging performance of the positive-electrode lithium-ion half-cell which contains Pristine PVDF with a low-current automated charging and discharging test system (AcuTech Systems, BAT-750B). Set the voltage to 2.8~4.2V, the charging current to 0.1 C, and the discharging current to 0.1 C, 0.5 C, 1 C, 3 C, 5 C.

TABLE 15

Capacitance levels of the positive electrode half-cell which contains the copolymer of embodiment 1-1 and doped PVDF against charging and discharging currents

| | discharge speed (C-rate) | | | | |
| --- | --- | --- | --- | --- | --- |
| | C/10 | C/2 | 1 C | 3 C | 5 C |
| capacitance (mAh $g^{-1}$) | 173 | 161 | 142 | 91 | 60 |

Comparison 1: Pristine PVDF Positive Electrode

Comparison 1-1: Preparation of Li(NiCoMn)$O_2$ Positive Electrode Material by Using Polyvinylidene Difluoride (PVDF) as Adhesive Mix PVDF, commercially-available Super P and commercially-available Li(NiCoMn)$O_2$ (BASF) at the ratio of 2.1:2.5:95.4 by weight in solvent, such as NMP, and then blend the mixture with a blender (Hai Yu) for an hour to form a paste. Coat the paste onto aluminum foil with automatic coating machine (elcometer, 3570), then place the paste-coated aluminum foil in a vacuum oven, and heat the paste-coated aluminum foil in the vacuum oven at 100° C. for 24 hours. Afterward, roll-press the paste-coated aluminum foil with a roll-press machine to produce Li(NiCoMn)$O_2$ positive electrode, using Pristine PVDF as adhesive.

Comparison 1-2: 3M adhesive tape is adhered to the positive electrode test plate of PVDF prepared in comparison 1-1, and then the positive electrode test plate of PVDF undergoes a pull test with a puller (ALGOL, JSV-HS1000).

Figure 3:
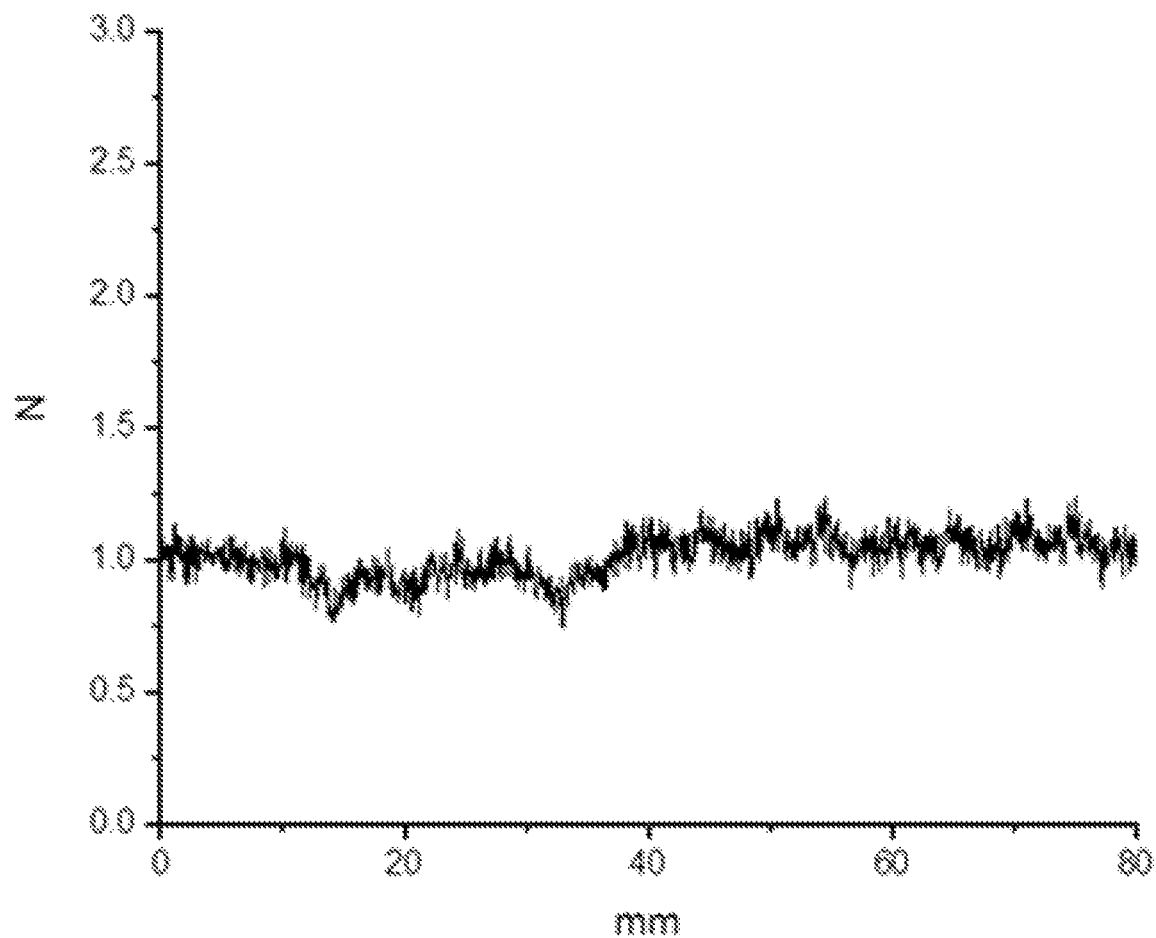
FIG. 3 shows the results of an adhesiveness test conducted on a PVDF-containing Li(NiCoMn)O$_2$ positive electrode.

FIG. 3 shows the result of the pull test conducted on the positive electrode of the adhesive, using PVDF of comparison 1 as the positive electrode.

Comparison 1-3: package the PVDF Li(NiCoMn)$O_2$ positive electrode prepared in embodiment 1-1 in the form of button cells. First, use commercially-available polypropylene (PP) film as a separator disposed between the Li(NiCoMn)$O_2$ positive electrode and lithium negative electrode. Measure the charging and discharging performance of the positive-electrode lithium-ion half-cell which contains Pristine PVDF with a low-current automated charging and discharging test system (AcuTech Systems, BAT-750B). Set the voltage to 2.8~4.2V, the charging current to 0.1 C, and the discharging current to 0.1 C, 0.5 C, 1 C, 3 C, 5 C.

Table 16 shows the capacitance levels of the positive-electrode lithium-ion half-cell in comparison 1-3 against discharging current levels.

TABLE 16

| | discharge speed (C-rate) | | | | |
| --- | --- | --- | --- | --- | --- |
| | C/10 | C/2 | 1 C | 3 C | 5 C |
| capacitance (mAh $g^{-1}$) | 141 | 128 | 115 | 60 | 0 |

Comparison 2: PVDF (Negative Electrode)

Comparison 2-1: Preparation of Graphite Negative Electrode Plate by Using PVDF as Adhesive Mix PVDF, commercially-available Super P and commercially-available graphite at the ratio of 2.1:2.5:95.4 by weight in solvent, such as NMP, and then blend the mixture with a blender (Hai Yu) for an hour to form a paste. Coat the paste onto copper foil with automatic coating machine (elcometer, 3570). Place the paste-coated copper foil in a vacuum oven, and heat the paste-coated copper foil in the vacuum oven at 100° C. for 24 hours. Afterward, roll-press the paste-coated copper foil with a roll-press machine to produce the graphite negative electrode containing the PVDF adhesive.

Comparison 2-2: package the PVDF graphite negative electrode prepared in comparison 2-1 in the form of button cells. First, use commercially-available polypropylene (PP) film as a separator disposed between the Li(NiCoMn)$O_2$ positive electrode and lithium negative electrode. Measure the charging and discharging performance of the negative-electrode lithium-ion half-cell with PVDF adhesive, using a low-current automated charging and discharging test system (AcuTech Systems, BAT-750B). Set the voltage to 0.5~2V, the charging current to 0.1 C, and the discharging current to 0.1 C, 0.5 C, 1 C, 3 C, 5 C.

Table 17 shows the capacitance levels of the negative-electrode lithium-ion cell of comparison 2-2 against discharging current levels.

TABLE 17

| | discharge speed (C-rate) | | | |
| --- | --- | --- | --- | --- |
| | C/10 | C/2 | 1 C | 3 C |
| capacitance (mAh $g^{-1}$) | 350 | 295 | 216 | 47 |

As indicated by the results shown in FIGS. 1-3, using the copolymer of the present disclosure as the adhesive allows the paste to demonstrate a higher degree of adhesiveness than the PVDF of comparison 1, because the copolymer of the present disclosure has repeat units derived from 2-propenenitrile.

As indicated by the results shown in the FIG. 1~FIG. 3 and Table 1~Table 17, lithium-ion cells produced with the copolymer of embodiments 1-1~3-2 have excellent charging and discharging performance.

When the embodiments are compared with the comparisons, it shows that the energy storage device of the present disclosure has advantages as follows: at least one of anode, cathode and separator comprises a copolymer, and the copolymer is a copolymer or a derivative thereof, which is produced by polymerization of monomers containing conductive ion group and/or olefinic monomers in the presence of 2-propenenitrile. Therefore, the energy storage device which the copolymer is used therein has excellent charging and discharging performance to therefore effectively enhance the efficiency and extend the service life of the energy storage device.

While the present disclosure has been described by means of specific embodiments, numerous modifications and variations could be made thereto by those skilled in the art without departing from the scope and spirit of the present disclosure set forth in the claims.

What is claimed is:

1. An energy storage device, comprising:
   an anode and a cathode; and
   a separator disposed between the anode and the cathode;
   wherein at least one of the anode, cathode, and separator comprises a copolymer, the copolymer has a structure expressed by the formula below,

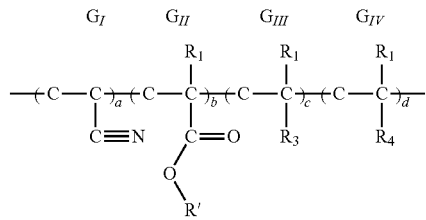

wherein,
R' is —$CH_3$, —H,

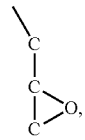

Li, —$NH_2$ or —$N(CH_3)_2$, $G_{III}$ is derived from monomers which contains a reactive group, wherein $R_3$ includes one selected from the group consisting of hydroxy group, epoxy group, isocyanate group, amino group, and a combination thereof, $G_{IV}$ is derived from olefinic monomers, wherein $R_4$ includes one selected from the group consisting of $C_1$~$C_{30}$ saturated or unsaturated alkyl group, phenyl group, benzyl group, and a combination thereof;

wherein $R_1$ is H or $CH_3$;

wherein the number of repeat units of the copolymer meets the following criteria:

$$\frac{a}{a+b+c+d} > 0, \frac{b}{a+b+c+d} > 0, \frac{c}{a+b+c+d} \geq 0, \frac{d}{a+b+c+d} \geq 0.$$

2. The energy storage device of claim 1, wherein the cocpolymer further reacts with polyether amine, taurine, polyether diamine, imidazole, 1,3-propanesultone or a derivative thereof so as to be modified or cross-linked.

3. The energy storage device of claim 1, wherein the anode comprises the copolymer in an amount of 0.01~30% by weight, and contains active substances and electrically conductive carbon, wherein the copolymer is used alone or doped with any polymer to function as an anode adhesive.

4. The energy storage device of claim 1, wherein the cathode comprises the copolymer in an amount of 0.01~30% by weight, wherein copolymer is used alone or doped with any polymer to function as a cathode adhesive.

5. The energy storage device of claim 1, wherein the separator comprises the copolymer in an amount of 0.01~30% by weight, and the separator is formed by coating a paste or formula.

6. The energy storage device of claim 1, wherein the solid-state electrolyte comprises the copolymer in an amount of 0.1~90% by weight.

* * * * *